United States Patent
Oberland

(10) Patent No.: US 8,670,676 B2
(45) Date of Patent: Mar. 11, 2014

(54) MODULATOR CONTROL SYSTEM AND METHOD IN AN OPTICAL NETWORK

(75) Inventor: Richard Oberland, Dublin (IE)

(73) Assignee: Intune Networks Limited, Dublin (IE)

( * ) Notice: Subject to any disclaimer, the term of this patent is extended or adjusted under 35 U.S.C. 154(b) by 0 days.

(21) Appl. No.: 13/509,531

(22) PCT Filed: Nov. 12, 2010

(86) PCT No.: PCT/EP2010/067416
§ 371 (c)(1),
(2), (4) Date: Jun. 13, 2012

(87) PCT Pub. No.: WO2011/058150
PCT Pub. Date: May 19, 2011

(65) Prior Publication Data
US 2012/0251104 A1   Oct. 4, 2012

(30) Foreign Application Priority Data

Nov. 12, 2009 (EP) .................... 09175739

(51) Int. Cl.
*H04B 10/04* (2011.01)
*H04J 14/02* (2006.01)

(52) U.S. Cl.
USPC ........... 398/198; 398/94; 398/195; 398/197

(58) Field of Classification Search
USPC ............. 398/182–201, 90, 93, 94
See application file for complete search history.

(56) References Cited

U.S. PATENT DOCUMENTS

| | | | |
|---|---|---|---|
| 2002/0181057 A1* | 12/2002 | Ao et al. | 359/161 |
| 2004/0190103 A1 | 9/2004 | Fujita et al. | |
| 2006/0210210 A1 | 9/2006 | Webb et al. | |
| 2007/0070488 A1 | 3/2007 | Miura et al. | |
| 2007/0081565 A1* | 4/2007 | Sasada et al. | 372/28 |
| 2007/0286609 A1* | 12/2007 | Ikram et al. | 398/197 |
| 2009/0274471 A1* | 11/2009 | Bowler et al. | 398/197 |
| 2009/0324255 A1* | 12/2009 | Nakamoto | 398/198 |

FOREIGN PATENT DOCUMENTS

EP    1600806 A2    11/2005

* cited by examiner

*Primary Examiner* — Daniel Dobson
(74) *Attorney, Agent, or Firm* — Occhiuti & Rohlicek LLP

(57) ABSTRACT

The invention relates to an optical modulator control system implemented in an optical burst mode transmitter, said control system comprising means for measuring a plurality of optical power sample values and associated optical wavelength data values from a modulator at a first sampling rate, wherein an average power table is generated from said values for each sample period and stored in a memory. The control system also comprises means for performing a control error calculation from two or more stored average power tables at a second sampling rate to calculate a single error value to provide gain and/or bias control signals, wherein the second sample rate is sampled at a slower rate than the first sample rate. The control system described optimises the modulator performance over temperature and lifetime in an optical network.

21 Claims, 13 Drawing Sheets

| Ch | chirp | average_power#1 | average_power#2 | power_diff | bias_error |
|---|---|---|---|---|---|
| 1 | -1 | 2346 | 2340 | -1 | +1 |
| 2 | 1 | 2419 | 0 | 0 | 0 |
| 3 | 1 | 0 | 0 | 0 | 0 |
| 4 | 1 | 2888 | 2889 | +1 | +1 |

Figure 12

MODULATOR CONTROL SYSTEM AND METHOD IN AN OPTICAL NETWORK

CROSS-REFERENCE TO RELATED APPLICATIONS

This application is the National Stage of International Application No. PCT/EP2010/067416, filed on Nov. 12, 2010, which claims the benefit of the priority date of European Application No. 09175739.3, filed on Nov. 12, 2009 and of U.S. provisional application No. 61/260,578, filed Nov. 12, 2009.

FIELD OF THE INVENTION

The invention relates to a modulator control system and method to combat temperature and aging drifts of components in an optical network. In particular the invention relates to a system and method to optimise transmission performance of optical bursts on multiple paths using controllable transmit parameters.

BACKGROUND TO THE INVENTION

Lithium Niobate MZ modulators are commonly used in modern optical transmission equipment to generate very high quality transmit signals. The high quality transmit signals can propagate long distances having high performance margin to counteract transmission impairments such as optical noise and dispersion. To a first order these modulators are insensitive to a wide range of input powers and wavelengths. However these types of modulator are prone to aging and temperature drift effects. Closed loop control schemes need to be implemented to successfully implement these components into real-life transmission equipment products. There are a few established techniques for controlling MZ modulators that are applicable to standard WDM transmitters, for example as disclosed in US Patent publication number US2006/0210210, assigned to Azea Networks ltd.

Typically amplitude modulated transmitters are set up and controlled for maximum extinction ratio with the logic '1' input signal corresponding to the maximum throughput of the modulator and the logic '0' input signal corresponding to the minimum throughput of the modulator. To achieve maximum optical extinction ratio the electrical drive signal amplitude should create a peak-to-peak phase difference of 180 degrees between the two light levels in the two combining arms of the MZ. A drive amplitude that creates a 180 degree peak-to-peak phase difference is commonly referred to as a 'Vpi' drive signal amplitude. A DC bias voltage is also required such that the absolute phase difference for the two input logic level voltages occur at 0 and 180 degree phase difference points, corresponding to the maximum and minimum light levels. The optimum DC bias voltage is commonly referred to as the quadrature bias point, as shown in FIG. 1.

For Lithium Niobate MZ modulators the optimum DC bias voltage can drift significantly over time and temperature, therefore a bias control loop is required to maintain optimum performance, as shown in FIG. 2. The drive signal amplitude requirement (e.g. Vpi) for the modulator does not change significantly, however the drive signal amplifier and associated electronics can age, so a control loop is usually implemented to maintain a Vpi drive signal.

There are several known modulator bias control schemes. An example would be one that periodically compares the modulator output optical power to an optimised reference value to determine an error signal for bias correction. This approach requires a calibrated look up table for the entire input power and wavelength range, and is prone to the problem of aging effects over time.

An alternative approach is to use a dither control signal with the error signal determined from a relative optical power difference. This technique has the advantage of working over a wide input power and wavelength range without the need for a complex calibration procedure. For bias control, a small perturbing dither signal is applied the driver gain. The dither signal can be generated using analogue control electronics or digital microprocessor control loops. The driver gain variation causes a small step change to the drive signal amplitude that in turn causes a small optical power change at the modulator output. The optical power change is used as the error signal to correct the bias voltage. For a MZ modulator, the optical power change (or error signal) conveniently tends to zero at the optimum bias position, as shown in FIG. 2.

Alternatively, the driver amplitude can be optimised with a similar routine. Here the bias voltage can be dithered instead of gain, and the optical power change monitored in the same way, to create an error signal for the driver gain. It is also possible to run both bias and gain dither optimisation routines sequentially, with the optimum bias or gain value being found regardless of the other bias/gain state. The dither routine is designed to operate at a faster rate than any temperature and aging effects, therefore the optimum bias and gain position can be maintained over life.

Both direct power and dither modulator control techniques can be successfully implemented into standard WDM transmission equipment, where standard continuous wave (CW) lasers are used with fixed wavelengths. However for next generation systems using optical burst switched technology there are a number of limitations to the prior art control schemes making them unusable.

For burst mode transmitters, lasers are rapidly switched on and off and can be set to any wavelength or power. Therefore the control loop must be insensitive to very fast laser power and wavelength changes. Furthermore the laser may be turned off for long periods of time; therefore the modulator bias can drift with no feedback control.

For the direct optical power feedback control scheme, a fast burst envelope detector and comparator can be used to compare the optical power to a reference power for a particular wavelength setting. However a problem with this scheme is that it relies on a complex calibration procedure that can change over time.

For standard dither control schemes, the modulator input power and wavelength must remain constant during two consecutive control steps for the optical power difference to be measured correctly. Therefore the optical power must be sampled twice for each burst; requiring very fast sampling and dithering circuits, knowledge of the start and end of each burst, and wavelength dependent burst settings. This is a complex procedure, expensive to implement, and prone to large control error discrepancies due to burst transmission effects e.g. power transients.

There is therefore a need to provide a modulator control system and method to combat the problems of temperature and aging drifts of components in an optical network and optimise transmission performance of optical bursts on multiple paths using controllable transmit parameters.

SUMMARY OF THE INVENTION

According to the present invention there is provided, as set out in the appended claims, an optical modulator control system implemented in an optical burst mode transmitter, said control system comprising:

means for measuring a plurality of optical power sample values and associated optical wavelength data values from a modulator at a first sampling rate, wherein an average power table is generated from said values for each sample period and stored in a memory;

means for performing a control error calculation from two or more stored average power tables at a second sampling rate to calculate a single error value to provide gain and/or bias control signals, wherein the second sample rate is sampled at a slower rate than the first sample rate.

The present invention describes a control method and system for a burst mode transmitter that successfully optimises the modulator performance over temperature and lifetime. The control scheme of the present invention provides the following advantages:—

Fast switchable input parameters (e.g. wavelength, power, FEC gain, bit rate) associated with each burst.

Fast switchable chirp on a wavelength assignment basis to improve dispersion tolerance and increase system reach Continuous performance optimisation during long traffic free periods where no wavelength allocated route is required.

A small dither signal that is asynchronous to burst timing, for bias and gain control.

Asynchronous optical power sampling of bursts at the modulator output.

Calculation of a single control error value from multiple input parameters.

In one embodiment the modulator comprises a chirped MZ modulator comprising a dispersion limited path.

In one embodiment the first control loop comprises means to lock onto either a positive or negative slope of the MZ modulator transfer function, to produce positive or negative chirped optical data.

In one embodiment there is provided means for providing a fast switchable chirp on a wavelength assigned basis for said modulator.

In one embodiment the modulator comprises a high bandwidth dedicated electrode on the MZ modulator comprising means to provide a fast non-disruptive bias change in between fast wavelength changes to increase said dispersion limited path.

In one embodiment the error calculation process comprises means to scale error values for different wavelength route assigned input parameters.

In one embodiment the assigned input parameter comprises switchable chirp values such that a separate chirp bias electrode voltage determines whether a positive or negative MZ modulator slope is selected to increase said dispersion limited path.

In one embodiment a difference error value is adjusted to compensate for the change in error sign due to the slope value of the MZ modulator, by using a predetermined reference table of chirp sign constants for each wavelength route, wherein chirp sign constants have a value of +1 or −1.

In one embodiment a dither signal is applied to the gain control signal.

In one embodiment the dither signal comprises a small dither amplitude to minimise dither noise.

In one embodiment the first sampling rate is chosen to be several orders of magnitude faster than the second sampling rate.

In one embodiment optical burst power is sampled asynchronously with respect to burst timing in the system.

In one embodiment there is provided for each optical sample power, a corresponding set laser wavelength is read, such that an FPGA is used to process the optical sample and wavelength data and send the values to the memory as an average power table.

In one embodiment, at the end of sampling period, the average power table is calculated for each wavelength entry that passes a minimum sample count criteria such that an accurate average power is calculated for the wavelengths that have enough sample counts during the sampling period.

In one embodiment the error calculation processes information from multiple power tables and switchable burst input parameters to calculate the single error value for gain or bias control.

In one embodiment the modulator comprises no optical power values, the control system comprises means for providing a dedicated 'off' laser wavelength to maintain optical power through the modulator during non-traffic periods.

In one embodiment said means comprises an optical channel filter positioned at the modulator output to prevent the 'off' wavelength propagating onto an optical network.

In one embodiment the 'off' wavelength is modulated with a data-like pattern to provide an error signal for the first control loop and lock to a desired optimised gain and bias point.

In another embodiment there is provided a method of controlling an optical burst mode transmitter using an optical modulator control system implemented in an optical burst mode transmitter, said method comprising the steps of:

measuring a plurality of optical power sample values and associated optical wavelength data values from a modulator at a first sampling rate on a first control loop, wherein an average power table is generated from said values for each sample period and stored in a memory;

performing a control error calculation from two or more stored average power tables at a second sampling rate to calculate a single error value to provide gain and/or bias control signals, wherein the second sample rate is sampled at a slower rate than the first sample rate.

A control system for use in an optical network comprising:

means for measuring a plurality of optical power sample values and associated optical wavelength data values from a modulator at a first sampling rate, wherein an average power table is generated from said values for each sample period and stored in a memory;

means for performing a control error calculation from two or more stored average power tables at a second sampling rate to calculate a single error value to provide gain and/or bias control signals, wherein the second sample rate is sampled at a slower rate than the first sample rate.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

FIG. 12 shows a reference table example of chirp input setting, optical power samples, power difference, and bias error versus channel wavelength.

DETAILED DESCRIPTION OF THE DRAWINGS

Figure 5:
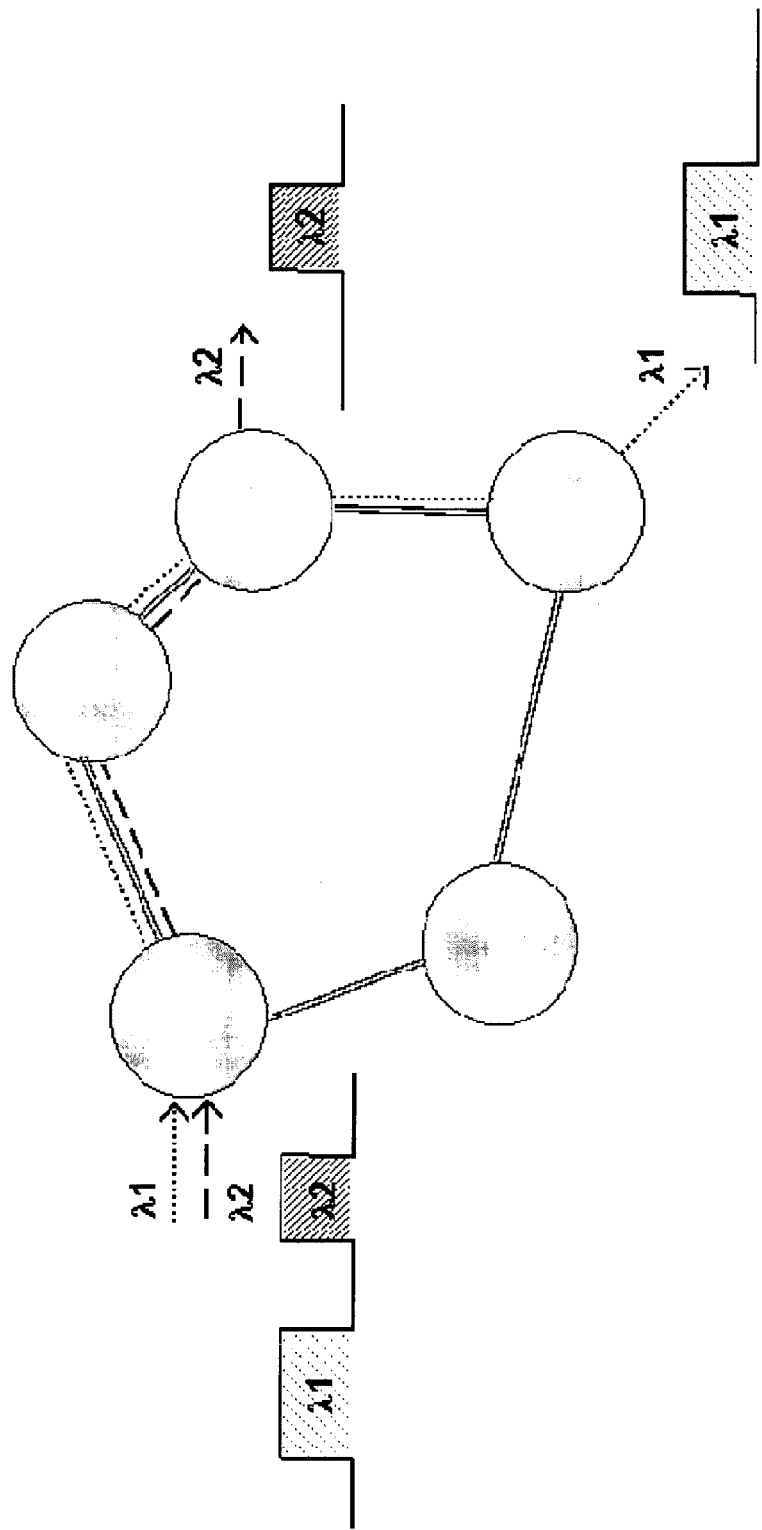
FIG. 5 illustrates an optical burst switch ring network example and different wavelength routed paths.

Referring now to the FIG. 5 there is illustrated an optical burst switched ring network, where data is transported in variable length bursts where each burst has an assigned carrier wavelength. The wavelength domain is used to optically route the burst traffic from a source node to a destination node. Each burst can route through a number of node and different span lengths before being dropped at the destination node. The transmit laser wavelength can be rapidly tuned to any channel allocation to allow full mesh connectivity to any node on the network. For each transmitter, a number of optical, electrical, and data layer parameters can be set for each burst to manage the path performance margin e.g. optical power, chirp, FEC gain. These input parameters are set at the start of each wavelength allocated route.

Figure 6:
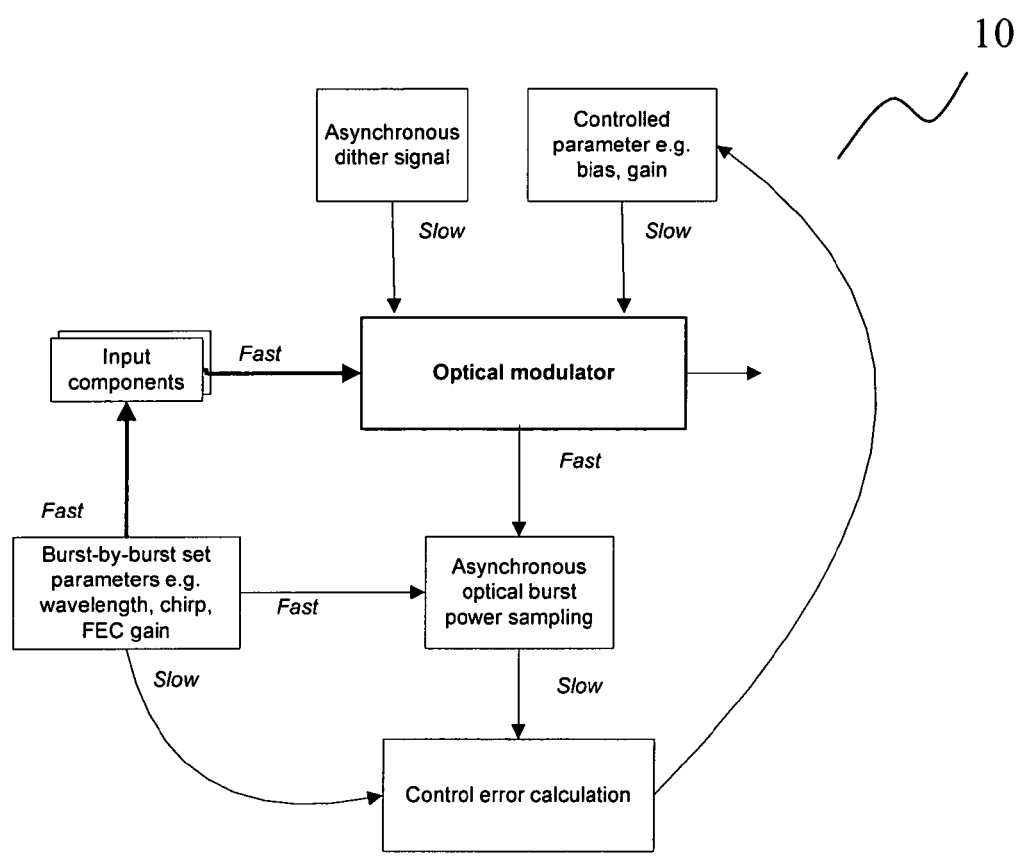
FIG. 6 illustrates the key building blocks for a burst mode modulator control scheme according to the invention.
Figure 7:
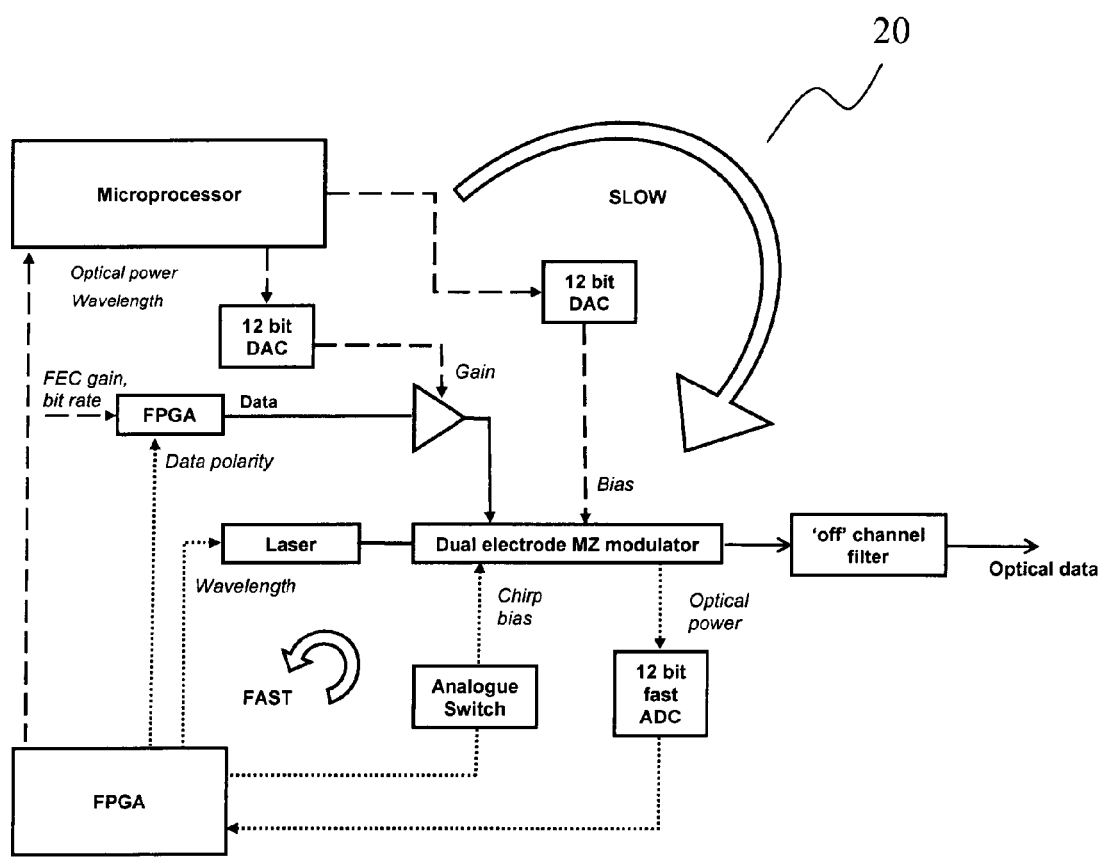
FIG. 7 illustrates a detailed topology for a the burst mode modulator control scheme according to the invention.
Figure 8:
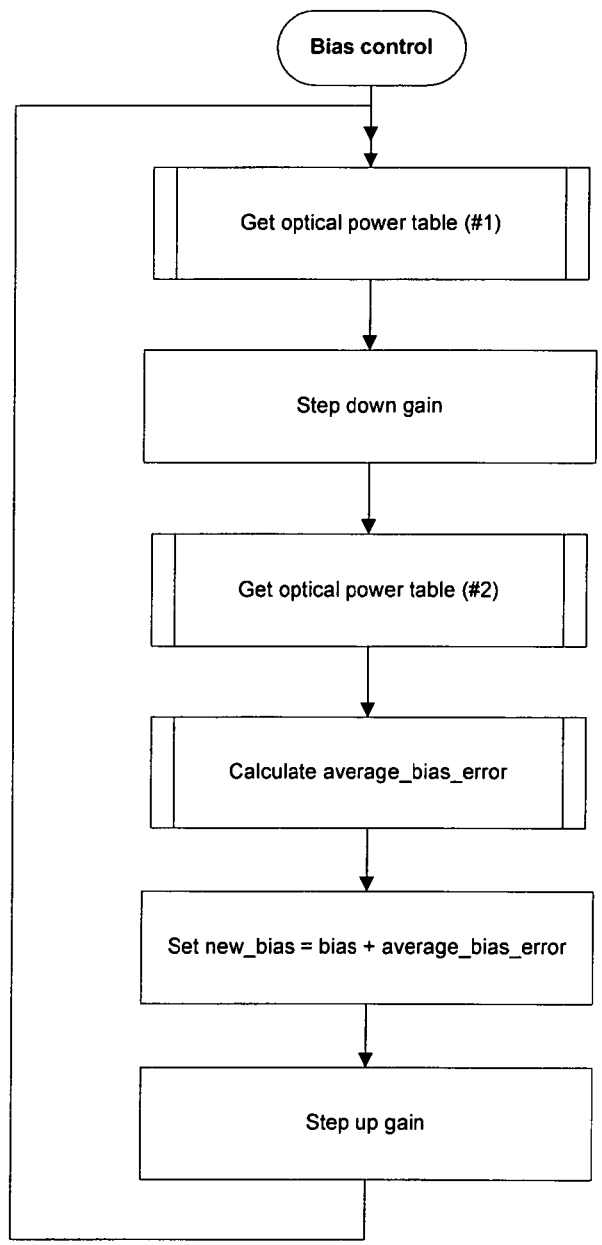
FIG. 8 shows a flow chart of a top level modulator bias control algorithm.
Figure 9:
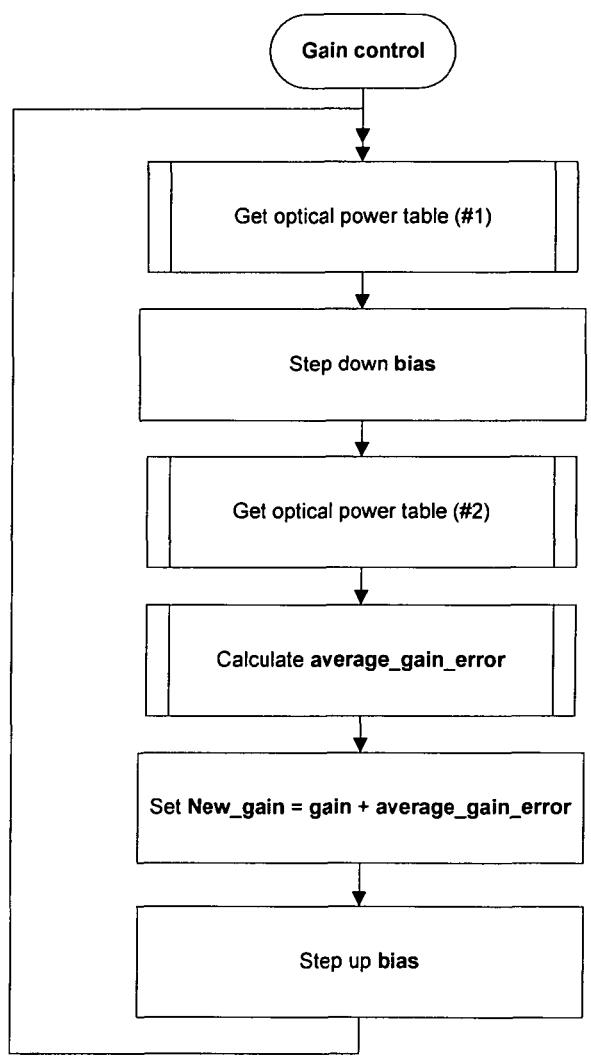
FIG. 9 shows a flow chart of a top level driver gain control algorithm.

FIGS. 6 and 7 illustrates preferred embodiments of the invention wherein a burst mode modulator control scheme is provided to optimise the transmitter and path performance margin in an optical burst mode ring network shown in FIG. 5, indicated generally by the reference numerals 10 and 20. The control scheme shown in FIGS. 5 and 6 comprises a first control loop with means for measuring a plurality of optical power sample values and associated optical wavelength data values from a modulator at a first sampling rate. An average power table is generated from the values for each sample period and stored in a memory. A second control loop comprises means for performing a control error calculation from two or more stored average power tables at a second sampling rate to calculate a single error value to provide gain and/or bias control signals, wherein the second sample rate is sampled at a slower rate than the first sample rate. For the present invention it is preferable that a modulator bias and gain refresh rate associated with the second control loop is slower than the optical burst power sampling rate. In this way any slow temperature changes and aging characteristics can be fully compensated, and enough samples can be captured to achieve a reliable error signal. In the context of the invention the first and second control loops can be viewed as a single control system. FIGS. 8 and 9 illustrate a flow chart showing how the bias and gain control signals can be set.

Figure 1:
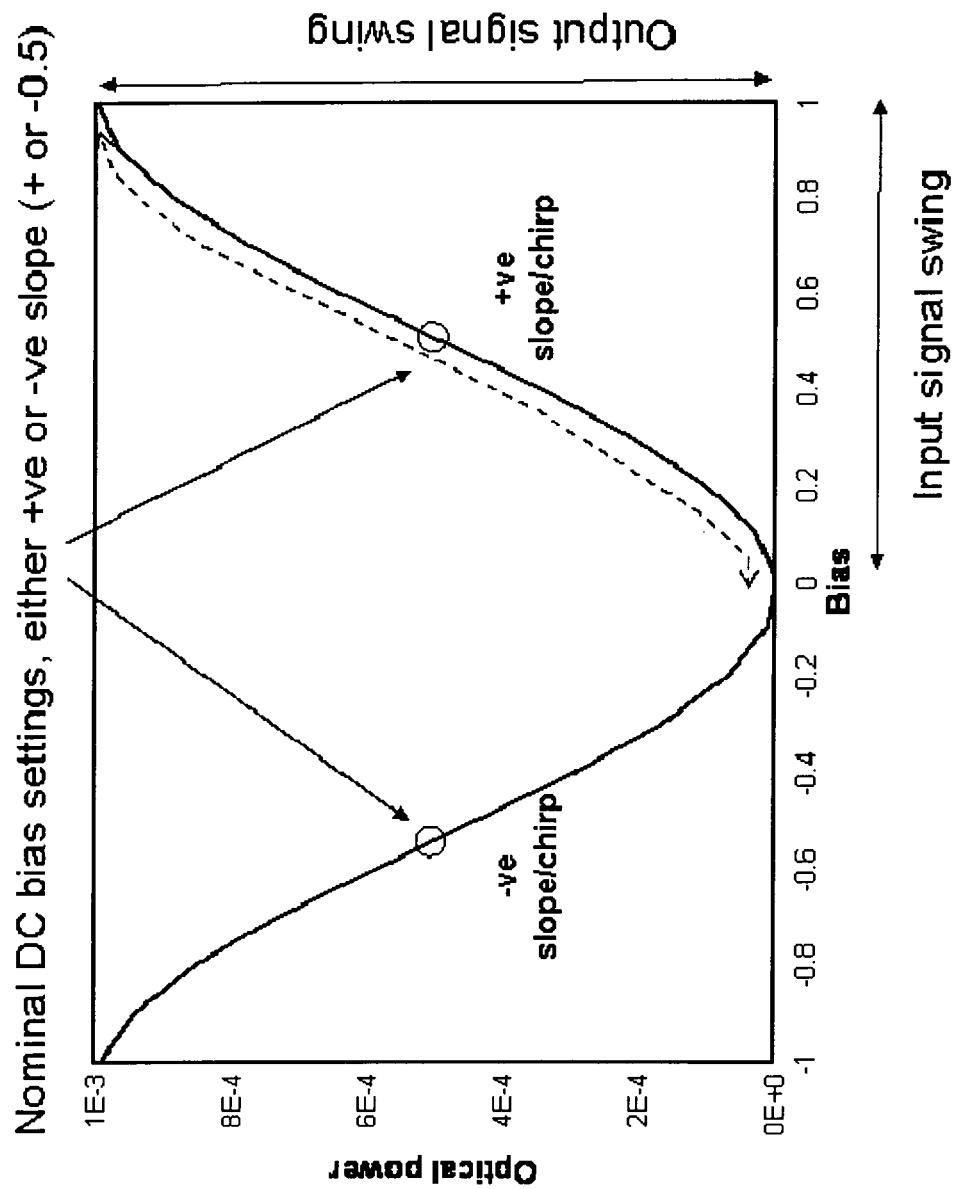
FIG. 1 illustrates the characteristic of a MZ modulator in terms of its drive amplitude and DC bias operating points.
Figure 2:
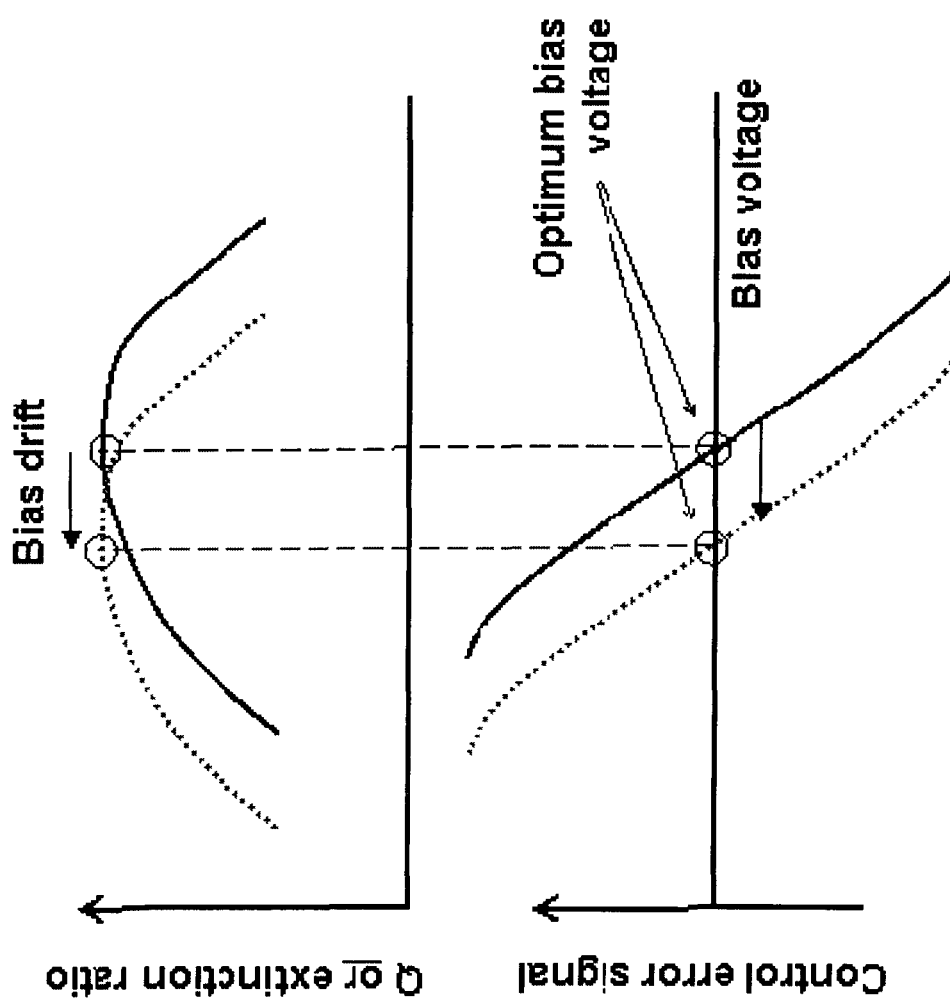
FIG. 2 shows an example of MZ modulator bias drift and the effect on the performance and control error signal.
Figure 3:
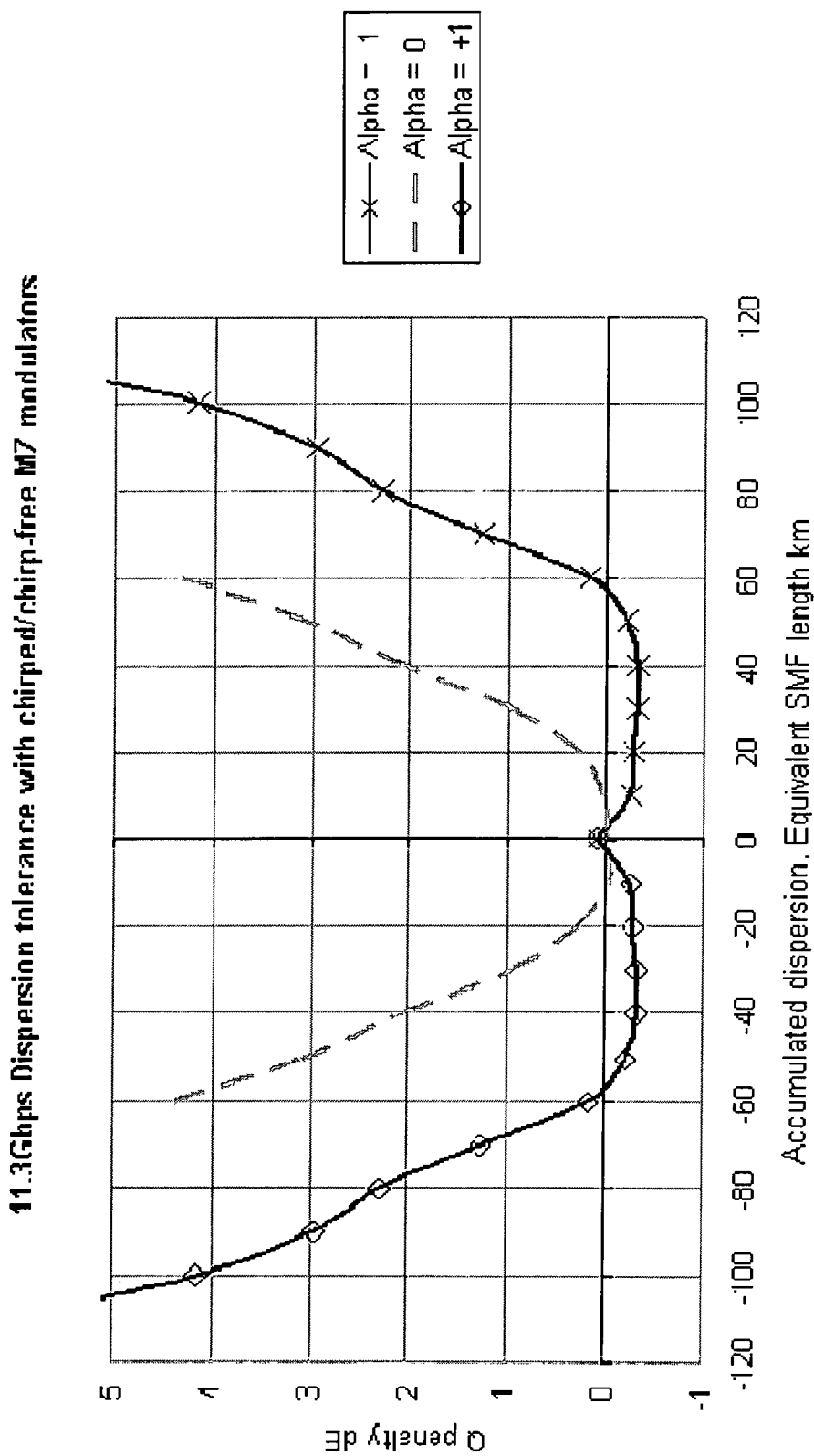
FIG. 3 shows an example of dispersion tolerance for a fixed chirp and switchable chirp transponder.

System margin can be increased further by preferably using intrinsically chirped MZ modulators on dispersion limited paths. The modulator bias control loop described can lock onto either the positive or negative slope of the MZ modulator transfer function, therefore producing a positive or negative chirped optical data. The dispersion tolerance of a transponder can be increased by >50% using an adaptable chirp sign transmitter, as shown in FIG. 3. The control system provides for fast switchable chirp on a wavelength assigned basis. It is preferable that a high bandwidth dedicated electrode on the MZ modulator is used to provide a fast bias change e.g. a dual electrode with a bias port bandwidth of >1 MHz. This avoids any crosstalk onto the data driven electrode.

The applied chirp bias voltage can be one of two values. Preferably the voltage difference between the two chirp bias values should be Vpi i.e. the voltage separation between the quadrature points of the two MZ slopes. The switchable chirp scheme requires a synchronous change to the data source polarity and error signal sign during a chirp bias voltage change.

For modulator bias optimisation a dither signal can be applied to the modulator driver amplifier gain control voltage. A small dither amplitude is chosen to minimise dither noise onto the data stream but provide a strong enough disturbance for a reliable error signal to be found.

For example, the typical dither modulation amplitude is chosen to be <5%, to give an extinction ratio penalty on the data pattern of <0.2 dB. The dither step period can be much greater (several orders on magnitude) than the burst period to account for temperature/aging effects and control circuit bandwidth limitations, but preferably short enough for a reasonable control loop response, that is useful for example at equipment start-up periods. For the present invention the applied dither signal is independent of the burst status.

When sampling the optical power at the modulator output, the optical monitor should have sufficient bandwidth (or resolution) to measure the burst envelope power, for example to resolve sub-microsecond bursts. The sampling rate is chosen to be several orders of magnitude faster than the dither step rate. The maximum optical power sampling rate is chosen to be insensitive to any data pattern content within a burst and any burst input setting parameters. The optical burst power can be sampled asynchronously with respect to the burst timing. The control scheme described does not depend on the burst present status i.e. a series of measured samples can be from the same wavelength burst, different wavelength bursts, or during periods of no burst presence.

Figure 10:
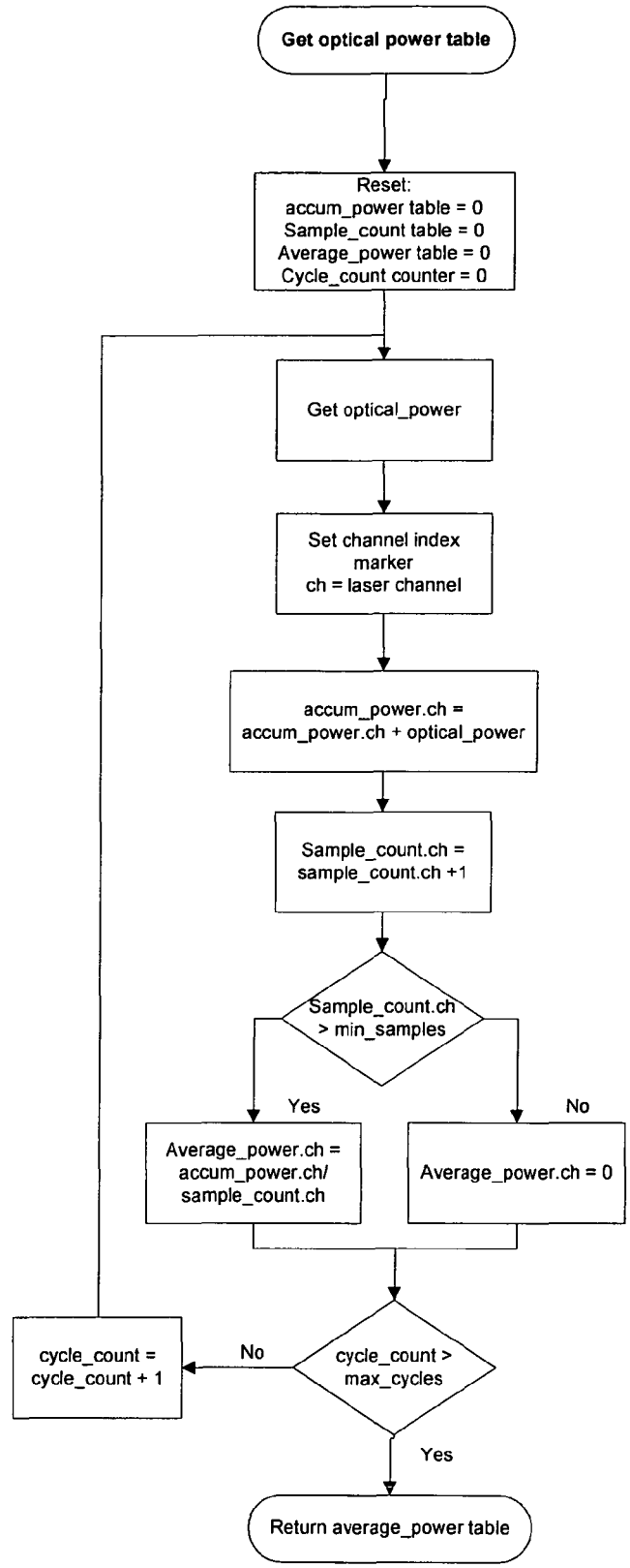
FIG. 10 shows a flow chart of an optical power sampling routine.

A large number of optical samples are captured during each dither step cycle. For each optical sample power, the corresponding set laser wavelength is read. An FPGA or equivalent processing means is used to process the optical sample and wavelength data and send the values to a temporary memory location. It is preferable from a memory and communication bandwidth point of view to process an accumulated sample power value and sample count for each wavelength instead of individual values. At the end of the dither period, the average power is calculated for each wavelength entry that passes a minimum sample count criteria. In this way an accurate average power for is found for the wavelengths that have enough sample counts during the dither step period. The average power table is sent (or requested by) the modulator control processor that stores the table of values until the error calculation routine is run. The temporary memory location for accumulated power and sample counter memory is reset by the FPGA at the start of each dither step. FIG. 10 illustrates a flow chart showing how the optical power tables are generated form a number of different samples.

Figure 11:
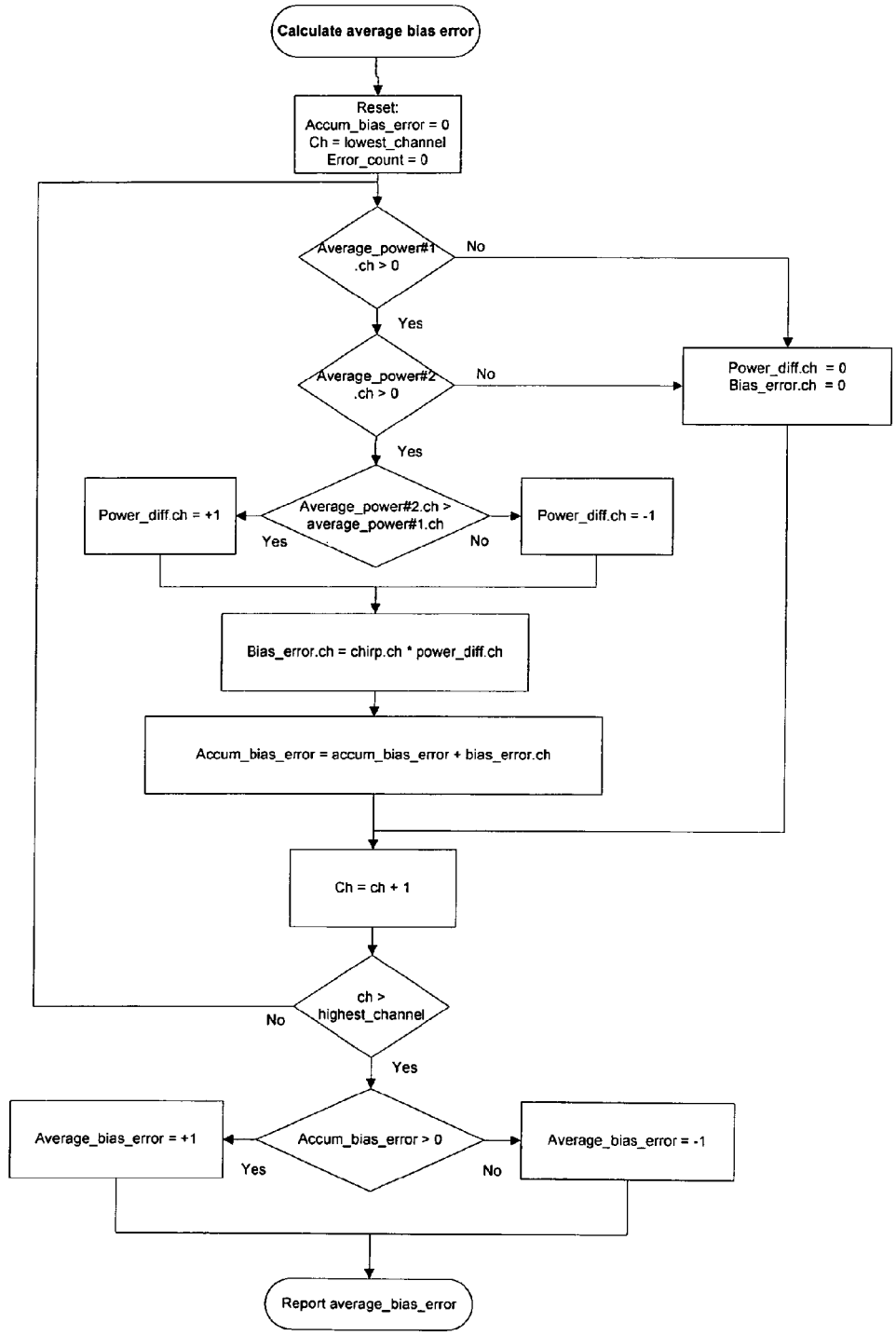
FIG. 11 shows a flow chart of a small step control error calculation routine.

An error calculation routine processes information from multiple table entries and switchable burst input parameters, and calculates a single error value for gain or bias control. For each dither step an average power versus channel wavelength table is transferred from the FPGA to the modulator control microprocessor. After two consecutive dither steps the average power difference between two tables can be compared for each valid wavelength entry. For bias control, the power difference from two consecutive gain dither steps is used. For gain control, the power difference from two consecutive bias dither steps is used. FIG. 11 shows a flow chart of a small step control error calculation routine.

For each wavelength, a power difference sign value of +1 or −1 is calculated depending on whether the power difference between the two table entries is positive or negative. For wavelength entries where no power entries are present a sign value of zero (0) is stored.

A further aspect of the error calculation process is to scale the error values for different wavelength route assigned input parameters. For example, the switchable chirp scheme described earlier, a separate chirp bias electrode voltage determines which the MZ slope is used, and is wavelength path dependent. The power difference error value is adjusted to compensate for the change in error sign due to the two MZ slope options. A predetermined reference table of chirp sign constants for each wavelength route is used, where entries have a value of +1 or −1. A new error value is found by multiplying the chirp sign constant by the power difference sign value. FIG. 12 shows a reference table example of chirp input setting, optical power samples, power difference, and bias error versus channel wavelength that can be stored.

All new error value table entries are then summed. If the total accumulated value is positive then a final average error value of +1 is reported. If the accumulated value is negative then a final average error of −1 is reported. If the accumulated error value is zero then the final average error is zero. The single average error value is used to correct the gain or bias set point by simply adding the error signal to the current gain or bias value. Once the set point has been updated then the entire control loop is repeated.

In the error calculation described, the final error signal takes a value of +1, 0, or −1 for each cycle. The small fixed step feedback approach adds resilience to any external input events that may cause incorrect power monitor readings.

In burst mode optical systems there may be long periods of time when no wavelength routed connection paths are required therefore no laser power is required. A further aspect of the invention is to use a dedicated 'off' laser wavelength to maintain optical power through the modulator during non-traffic periods. The 'off' laser wavelength may be the same for all transmitters but must not be a traffic reserved wavelength. Preferably an optical channel filter should be used at the modulator output to prevent the 'off' wavelength propagating onto the network. Preferably the 'off' wavelength should be modulated with a data-like pattern to provide a strong error signal for the modulator control loop and lock to the same optimised gain and bias point as an 'on' channel wavelength state.

In an alternative embodiment of the present invention, the final error signal value can take a range of values proportional to the power difference between bursts. Furthermore a constant can be multiplied to each wavelength value, for example, to speed up or down the control loop response. Further still an offset constant can be applied to each power difference value to change the optimum locking point of the bias and gain control loop.

Figure 13:
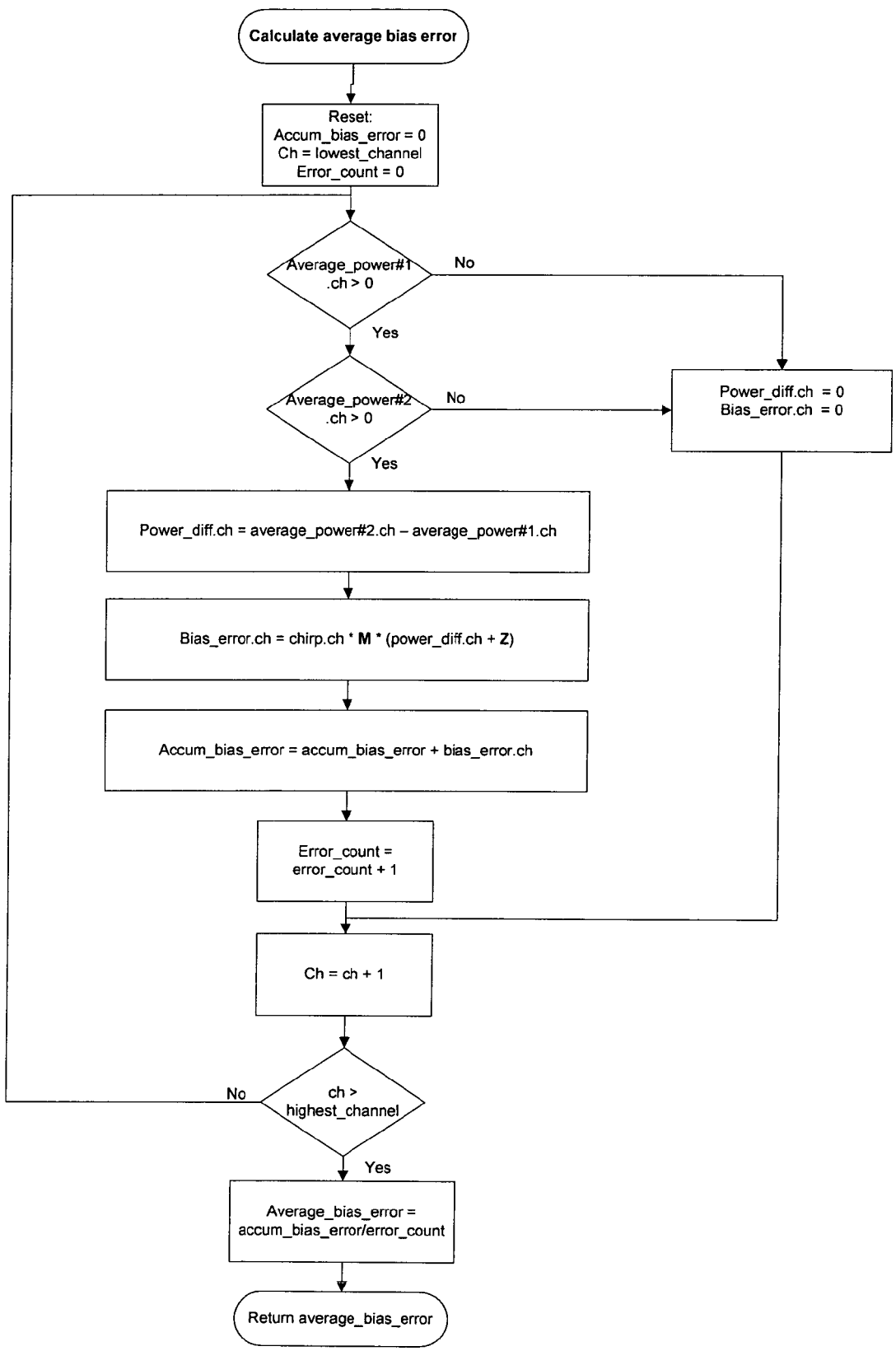
FIG. 13 shows a flow chart of a proportional/offset control error calculation routine.

By adding a constant to the wavelength values of the bias control loop, the target bias point can be moved away from the quadrature point. It has been shown that a slight performance (extinction ratio) improvement can be found by setting the bias point slightly below quadrature. FIG. 13 shows a flow chart of a proportional/offset control error calculation routine. Alternatively, by adding an offset to the wavelength values of the gain control loop, the target drive signal amplitude be moved away from the Vpi of the modulator. A drive amplitude other than Vpi may be beneficial in terms of improving the transmission performance by, for example, changing the optical duty cycle or chirp.

Figure 4:
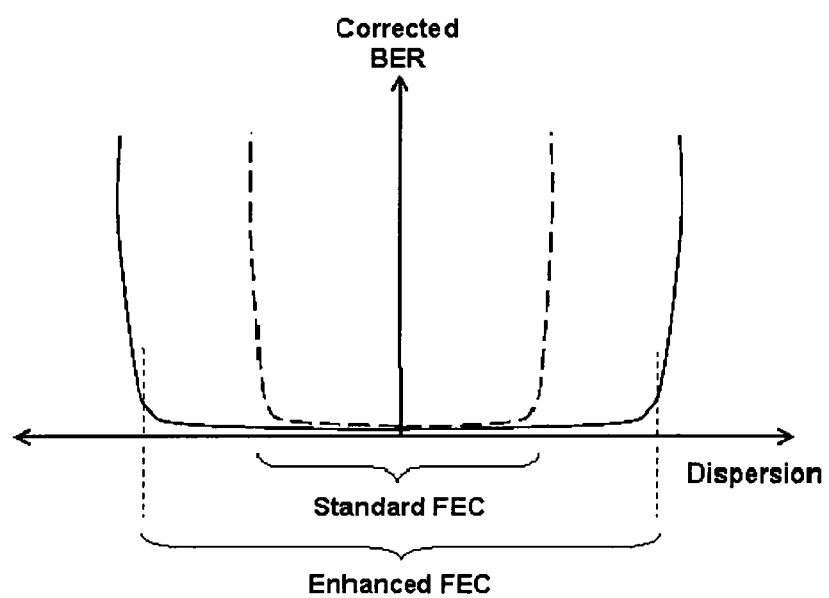
FIG. 4 shows an example of corrected bit error ratio versus dispersion for standard and enhanced FEC gain data.

It will be appreciated that the modulator control scheme is transparent to bursts having different FEC gains (e.g. 3 dB or 7 dB net coding gain) and bit rates (e.g. 9.95 Gbps or 11.3 Gbps). Therefore path performance margins can be increased to allow transmission on challenging links, as shown in FIG. 4.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The invention is not limited to the embodiments hereinbefore described but may be varied in both construction and detail.

The invention claimed is:

1. An optical modulator control system implemented in an optical burst mode transmitter, said control system comprising:
    means for measuring a plurality of optical power sample values and associated optical wavelength data values from a modulator at a first sampling rate, wherein an average power table is adapted to be generated from said values for each sample period and stored in a memory; and
    means for performing a control error calculation from two or more generated stored average power tables adapted to be selected at a second sampling rate to calculate a single error value to provide gain and/or bias control signals, wherein the second sample rate is sampled at a slower rate than the first sample rate.

2. The optical modulator control system as claimed in claim 1 wherein the modulator comprises a chirped MZ modulator comprising a dispersion limited path.

3. The optical modulator control system as claimed in claim 1 wherein the modulator comprises a chirped MZ modulator comprising a dispersion limited path and means to lock onto either a positive or negative slope of the MZ modulator transfer function, to produce positive or negative chirped optical data.

4. The optical modulator control system as claimed in claim 1 wherein the modulator comprises a chirped MZ modulator comprising a dispersion limited path and means for providing a fast switchable chirp on a wavelength assigned basis for said modulator.

5. The optical modulator control system as claimed in claim 1 wherein the modulator comprises a chirped MZ modulator comprising a dispersion limited path and said modulator comprises a high bandwidth dedicated electrode on the MZ modulator comprising means to provide a fast non-disruptive bias change in between fast wavelength changes to increase said dispersion limited path.

6. The optical modulator control system as claimed in claim 1 wherein the error calculation process comprises means to scale error values for different wavelength route assigned input parameters.

7. The optical modulator control system as claimed in claim 1 wherein the error calculation process comprises means to scale error values for different wavelength route assigned input parameters wherein the assigned input parameter comprises switchable chirp values such that a separate chirp bias electrode voltage determines whether a positive or negative MZ modulator slope is selected to increase said dispersion limited path.

8. The optical modulator control system as claimed in claim 1 wherein a difference error value is adjusted to compensate for the change in error sign due to the slope value of the modulator, by using a predetermined reference table of chirp sign constants for each wavelength route, wherein chirp sign constants have a value of +1 or −1.

9. The optical modulator control system as claimed in claim 1 wherein a dither signal is applied to the gain control signal.

10. The optical modulator control system as claimed in claim 1 wherein a dither signal is applied to the gain control signal, the dither signal comprises a small dither amplitude to minimise dither noise.

11. The optical modulator control system as claimed in claim 1 wherein the first sampling rate is chosen to be several orders of magnitude faster than the second sampling rate.

12. The optical modulator control system as claimed in claim 1 wherein optical burst power is sampled asynchronously with respect to burst timing in the system.

13. The optical modulator control system as claimed in claim 1 wherein for each optical sample power, a corresponding set laser wavelength is read, such that an FPGA is used to process the optical sample and wavelength data and send the values to the memory as an average power table.

14. The optical modulator control system as claimed in claim 1 wherein for each optical sample power, a corresponding set laser wavelength is read, such that an FPGA is used to process the optical sample and wavelength data and send the values to the memory as an average power table, and wherein at the end of sampling period, the average power table is calculated for each wavelength entry that passes a minimum sample count criteria such that an accurate average power is calculated for the wavelengths that have enough sample counts during the sampling period.

15. The optical modulator control system as claimed in claim 1 wherein the error calculation processes information from multiple power tables and switchable burst input parameters to calculate the single error value for gain or bias control.

16. The optical modulator control system as claimed in claim 1 wherein the modulator comprises no optical power values, the control system comprises means for providing a dedicated 'off' laser wavelength to maintain optical power through the modulator during non-traffic periods.

17. The optical modulator control system as claimed in claim 1 wherein the modulator comprises no optical power values, the control system comprises means for providing a dedicated 'off' laser wavelength to maintain optical power through the modulator during non-traffic periods, said means comprises an optical channel filter positioned at the modulator output to prevent the 'off' wavelength propagating onto an optical network.

18. The optical modulator control system as claimed in claim 1 wherein an 'off' wavelength is modulated with a data-like pattern to provide an error signal for the first control loop and lock to a desired optimised gain and bias point.

19. A method of controlling an optical burst mode transmitter using an optical modulator control system implemented in an optical burst mode transmitter, said method comprising the steps of:
measuring a plurality of optical power sample values and associated optical wavelength data values from a modulator at a first sampling rate on a first control loop, wherein an average power table is generated from said values for each sample period and stored in a memory; and
performing a control error calculation from two or more stored average power tables at a second sampling rate to calculate a single error value to provide gain and/or bias control signals, wherein the second sample rate is sampled at a slower rate than the first sample rate.

20. A method comprising:
in a microprocessor located in an optical burst mode transmitter,
measuring a plurality of optical power sample values and associated optical wavelength data values from a modulator at a first sampling rate on a first control loop, wherein an average power table is generated from said values for each sample period and stored in a memory; and
performing a control error calculation from two or more stored average power tables at a second sampling rate to calculate a single error value to provide gain and/or bias control signals, wherein the second sample rate is sampled at a slower rate than the first sample rate.

21. An optical modulator control system implemented in an optical burst mode transmitter, said control system comprising:
a circuit for measuring a plurality of optical power sample values and associated optical wavelength data values from a modulator at a first sampling rate, wherein an average power table is adapted to be generated from said values for each sample period and stored in a memory; and
a circuit for performing a control error calculation from two or more generated stored average power tables adapted to be selected at a second sampling rate to calculate a single error value to provide gain and/or bias control signals, wherein the second sample rate is sampled at a slower rate than the first sample rate.

* * * * *